H. HARDISTY.
NUT LOCK.
APPLICATION FILED MAY 27, 1919.

1,319,279. Patented Oct. 21, 1919.

WITNESSES
Howard D. Orr
F. T. Chapman

Henry Hardisty, INVENTOR,

BY E. G. Siggers

ATTORNEY

UNITED STATES PATENT OFFICE.

HENRY HARDISTY, OF OAK GROVE, OREGON, ASSIGNOR TO THE NUT LOCK COMPANY, A CORPORATION OF OREGON.

NUT-LOCK.

1,319,279.  Specification of Letters Patent.  Patented Oct. 21, 1919.

Application filed May 27, 1919. Serial No. 300,144.

*To all whom it may concern:*

Be it known that I, HENRY HARDISTY, a citizen of the United States, residing at Oak Grove, in the county of Clackamas and State of Oregon, have invented a new and useful Nut-Lock, of which the following is a specification.

This invention has reference to nut locks and its object is to provide a simple attachment for an ordinary nut and threaded stem to which it is applied, whereby the nut may be effectively locked in the tight position without liability of loosening and yet which may be readily released at will.

The invention comprises a nut lock of the split washer type which will bind tightly on the threads of the bolt or stem to which the nut is applied, the washer being shaped to seat in the valley between two threads and also at one end to embrace one thread with the same end of the washer turned back upon itself to provide a tongue to enter between the same two threads that the first end of the washer enters and to grip therein. The adjacent ends of the washer are shaped to receive one end of a spanner so that the washer may be readily tightened or loosened with the tightening such as to avoid unintentional loosening under ordinary conditions of use.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1:
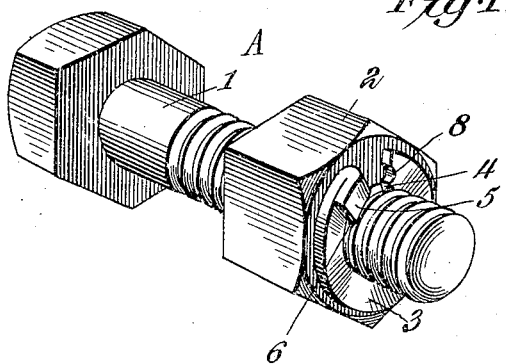
Figure 1 is a perspective view of a bolt with a nut lock applied thereto.

Referring to the drawing, there is shown a bolt A having a threaded stem 1 and a nut 2 adapted thereto. While the drawing shows a bolt A it will be understood that the steam 1 may be indicative of any suitable threaded stem for the application of the nut 2, both the stem and nut being of ordinary construction.

There is provided, for application to the threaded stem 1 on the side of the nut 2 remote from the part to be held by the nut an incomplete ring 3 made of flat spring steel stock and having a pitch corresponding to the pitch of the threads of the screw stem 1. The inner periphery of the ring 3 is formed into a thread 4 defining an incomplete turn and corresponding to the threads of the screw stem 1, and at one end the incomplete ring has a return portion 5 formed with a tongue 6 conforming to the thread 4 but projecting toward the center of the ring to a somewhat greater extent than said thread 4. At the end of the incomplete ring, where the return portion 5 joins the body of the ring 3, a notch 7 is provided to give passage to the threads of the stem 1 with the notch 7 displaced to one side of the thread 4 at the other end of the ring by a distance corresponding to the pitch of the threads of the screw stem 1. That end of the ring 3 remote from the return portion 5 is provided with a notch or recess 8 arranged transversely of the ring.

When the nut 2 is screwed to the desired position and as firmly as necessary the lock washer or ring 3 is screwed onto the threaded stem in a manner similar to the screwing of the nut thereon, until ultimately the end of the lock ring having the return portion 5 engages the outer end of the nut, such portion of the ring having the forward trend. The thread 4 travels between two adjacent turns of the screw portion of the stem 1 with the other end of the washer trailing in the valley between the next turns in order. The tongue 6 follows after the trailing end of the thread 4 between the same two threads of the stem 1. Therefore, that end of the washer 3 engaging the outer end of the nut seats in two adjacent valleys between the threads with the intermediate thread of the stem embraced on opposite sides by the thread 4 and tongue 6 respectively. In this manner the lock washer is made to grip the stem 1 with particular force and the forward end of the washer is jammed tightly into engagement with two adjacent threads, thereby greatly increasing the holding effect of the washer.

Figure 2:
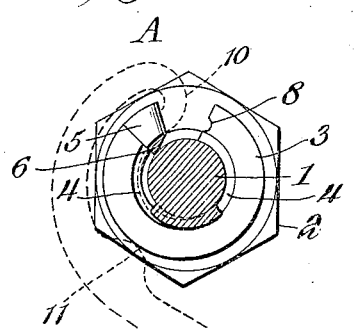
Fig. 2 is an end view of the structure shown in Fig. 1, with the shank of the bolt in cross section where engaged by the lock washer, the figure also indicating an applied spanner in dotted lines.
Figure 3:
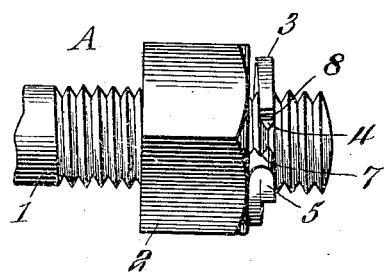
Fig. 3 is a side elevation of a threaded stem with a nut and a lock washer applied thereto.
Figure 4:
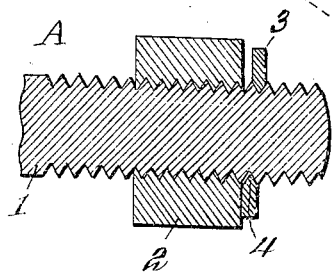
Fig. 4 is a longitudinal diametric section of the structure shown in Fig. 3.
Figure 5:
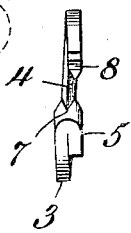
Fig. 5 is an edge view of the lock washer.
Figure 6:
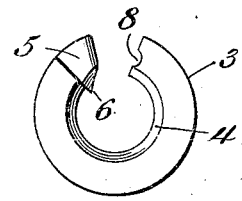
Fig. 6 is a plan view of the lock washer.

On applying the lock washer the return end of the washer leads and on meeting the nut 2 jams into firm engagement with the threads of the stem 1. In order to firmly tighten the lock washer there is provided a spanner 9 indicated in dotted lines in Fig. 2, this spanner having a nose end 10 and a boss 11 in spaced relation thereto in order that the spanner may grip one end or the other of the ring 3. In Fig. 2 the spanner is shown in position to loosen or remove the lock washer by turning it counter-clockwise. To tighten the washer the spanner is reversed in position from that shown in Fig. 2 so that the nose end 10 will engage the recessed end 8 of the washer and by the application of sufficient force the washer is turned into rigid engagement with the nut, spreading the washer so that when released from the force applied thereto by the spanner the end 8 will spring back into particularly forceful engagement with the threads of the stem 1 so that forces to which the nut and lock may be subjected under conditions of use are insufficient to loosen the lock ring. However, when the spanner is applied so as to turn the washer spirally along the threads in the unscrewing direction such action is quickly effective to release the washer from locking condition.

What is clamed is:—

1. A nut for application to a threaded stem to which the nut is applied, comprising an incomplete ring of flat stock with an interior thread corresponding in pitch to that of the threaded stem, the ring having one end returned upon itself and provided with a tongue constituting a neighboring thread of short length to the first-named thread.

2. A nut lock for application to a threaded stem to which the nut is applied, comprising an incomplete ring of flat stock with an interior thread corresponding in pitch to that of the threaded stem, the ring having one end returned upon itself and provided with a tongue constituting a neighboring thread of short length to the first-named thread, said ring having the end opposite to the returned end formed with a transverse notch.

3. A nut lock for application to a threaded stem to which the nut is applied, comprising an incomplete ring of flat spring steel stock, having a pitch corresponding to the pitch of the threads of said stem, the inner periphery of said ring being formed into a thread defining an incomplete turn, one end of said ring having an enlarged portion formed with a tongue conforming to the said thread but projecting toward the center of the ring to a greater extent than said thread, said enlarged portion having a notch to receive the threads of the stem, and the other end of the ring having a transverse notch, the ends of the ring being spaced apart.

In testimony that I claim the foregoing as my own, I have hereto affixed my signature.

HENRY HARDISTY.

Witnesses:
ANNA HARDISTY,
J. M. HADDOCK.

Copies of this patent may be obtained for five cents each, by addressing the "Commissioner of Patents, Washington, D. C."